Patented July 27, 1948

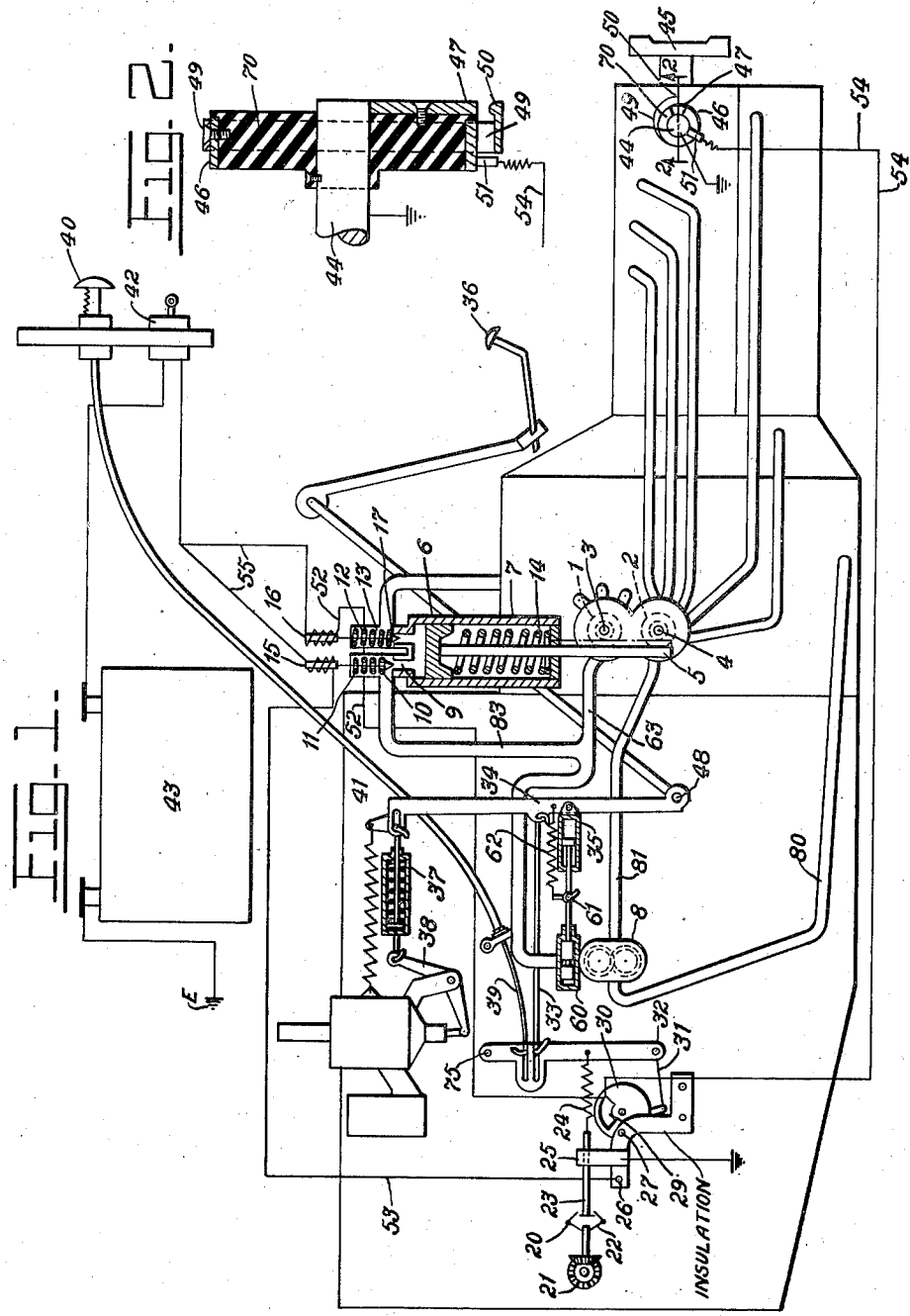

2,446,087

UNITED STATES PATENT OFFICE 2,446,087

CONTROLLING MEANS FOR VARIABLE-SPEED GEARS

Howard Frederick Hobbs, Leamington Spa, England, assignor, by direct and mesne assignments, to Hobbs Transmission Limited, Leamington Spa, England, a British company Application April 6, 1943, Serial No. 482,017
In Great Britain April 14, 1942

5 Claims. (Cl. 74—472)

This invention relates to controlling means for variable speed gears coupled to an engine, for example that of a motor vehicle, and its main object is to enable variation in the position of a control pedal or member (which may also control the engine throttle) to produce all engine speeds between a low speed near stalling speed and a predetermined maximum speed, for example, maximum horsepower speed, at will, while remaining in or about any and all of the ratios provided by the variable speed gear. This is desirable so that the following results may be obtained:

(a) High engine speed and maximum horsepower and consequently high acceleration can be obtained rapidly on opening the throttle.

(b) Ability to start and run at low engine speed for economy and comfort and at low output speeds without changing transmission ratios when not required, for example, whilst driving around corners at low speeds when change to higher ratio is only required on moving the control member to accelerate, and not before the throttle is fully or nearly fully opened thereby providing all the power available with the particular transmission ratio that is already in operation.

(c) Automatic changing of transmission ratios to maintain engine speeds below a required maximum.

(d) Automatic changing of transmission ratios, at or about full throttle only, to maintain engine speeds above a required minimum.

(e) Ability for the operator during driving to vary the required maximum and minimum speeds of the engine within predetermined limits or in other words, to select any required ratio or engine speed (or range of ratios or speeds) within predetermined limits whilst at or about full throttle. This is desirable because any required horse power can be developed more efficiently on full throttle than at any less throttle.

(f) Automatic changing of transmission ratios to high ratio gear when output speeds fall below a predetermined minimum, for example, below stalling speed, so that the gear is ready for restarting.

According to the invention, the controlling means comprises a device actuated according to gear input shaft speed and adapted to control variation of gear transmission ratio automatically so as to maintain input speeds within a predetermined range, means whereby the operator can vary the action of the said device so as to vary this range, means which move according to throttle opening and operate to render the said device capable of causing transmission ratio change to high ratios only when operating above a predetermined throttle opening (preferably at or near full throttle), and means actuated by output speeds and serving to effect change to high ratios when the output speed falls below a predetermined minimum. A separately operable control means may be provided for rendering said device capable of causing change to higher ratios below said predetermined throttle opening when required for unusual conditions, for example, for using engine braking on a hill.

A constructional form of the invention embodying a number of important features will now be described by way of example with reference to the accompanying drawing of which Fig. 1 is a diagrammatic view and Fig. 2 is a sectional view of a switch taken on line 2—2 of Fig. 1 with a part thereof in a slightly different position.

In the drawing the members 1, 2, are the rotary valves of the gear described in the specification of my patent application No. 417,739, now Patent No. 2,381,593, dated Aug. 7, 1945, and also in my British Patent No. 549,988. Valve 1 serves to control and distribute the flow of actuating fluid to the distributor clutches described in the above-mentioned British patent and valve 2 serves to control the flow of fluid from the pump 8 to the control gears described in said British patent. The valves carry pinions 3, 4, with which a rack 5 is in gear. The rack 5 is connected to a piston 6 which works in a cylinder 7 supplied on one side of the piston with oil through a hole 9 normally closed by a valve or closure member 11 held by a spring 10 and adapted to be opened by actuation of the valve stem in the axial direction. The oil is supplied under pressure by a pump 8 having an intake pipe 80 and delivering said oil to the valve 1 through a pipe 63 and to the valve 2 through a pipe 81, also to the cylinder 7 through a pipe 83 branching from the pipe 63. A similarly operable leak outlet hole 17 and valve 12 is also provided in the cylinder and adapted to be held closed by a spring 13. The piston 6 is moved in one direction by the pressure of the fluid against the action of a spring 14 which moves the piston in the other direction when the leak valve 12 is opened. Thus, when the inlet valve 11 is opened the piston is moved downwards to change transmission ratios up towards low ratios (that is, towards 1:1 or overdrive) and opening of the leak valve 12 will allow the piston to be moved by the spring in the other direction to change ratios down towards high ratios.

The valve stems are adapted to be actuated by two solenoids 15, 16, supplied with current by means of two circuits 55, one 53 of which can be connected to ground by part 25, the other 52 of which can be connected to ground through 27, 25 or grounded through the rotary switch 47 having four breaks which can be connected by appropriate control. The first break is controlled by a device comprising a governor for preventing engine speeds from becoming too high; the second break is controlled also by the governor and prevents engine speeds from falling too low; the third break permits the circuit to be made through the second break only when the engine is at or about full throttle; and the fourth break closes below idling output speeds to produce high ratios for restarting.

The governor 20 is of centrifugal type driven by the gear input or engine by gearing 21 and having its centrifugal arms 22 arranged to move an electric earthed contact rod 23 in one direction (to the left in the drawing) with increase of the input speeds. The contact arm is retracted by a spring 24 with decreasing speeds. The rod 23 carries an electric contact 25 which contacts with an electric contact 26 at a predetermined maximum speed, and contacts with an electric contact 27 at a predetermined minimum speed. Another electric contact 29 is carried by a rotary member 30 that is connected by a rod 31 to a lever 32 which is pivoted at 75 and is connected by a rod 33 and lever 34, to the accelerator pedal 36, the lever 34 and pedal 36 being mounted on a pivot 48. The lever 34 is connected to the throttle lever 38 through two lost motion devices 37 and 41 the purposes of which will be described hereinafter. The lever 32 is also connected by a wire 39 to a hand control 40. The rod 33 and the wire 39 both connect to the lever 32 by pin and slot lost motion devices so that each can operate for a distance without the other.

The switch assembly 25 to 29 comprises an insulator disc 30 pivotally mounted and carrying the metal block 29. The wire 52 is connected permanently to block 29, and the member that carries the metal contact parts 26 and 27 is fixed and made of insulating material. The part 25 is made of metal and is movable.

One terminal of each of the solenoids is connected through the usual ignition switch 42 to one terminal of the car battery 43 the other terminal of which is connected to earth at E. The other terminal of the outlet solenoid is connected by wires 52, 54, through an electric conducting brush 51 to a metal ring 46 that is insulated (by a bush 70) from but fixed to a spindle 44 driven by the gear output shaft. A spring 49 is fixed at one end to the ring 46 in electrical connection therewith. The other end of the spring carries an electric contact 50 adapted to touch an electric contact 47 fixed on the shaft 44 so that the contact 47 is permanently earthed. Above a predetermined low speed of the output shaft the contact 50 will be held apart from the contact 47 by centrifugal force but contacts below that speed to earth the outlet solenoid. The same solenoid is also connected by wire 52 to the contact 29. The other solenoid is connected by wire 53 to the contact 26.

The aforesaid first break is between 25 and 26; the second between 25 and 27; the third is between 27 and 29, this break being completed by the rotary element 30 bringing the contact 29 into contact with 27 only after the accelerator pedal has moved to about its full throttle position; and the fourth between 47 and 50.

When the contacts 27, 29, are separated the driver can drive slowly, for example when going round corners, without change to higher ratio but when the contacts are in engagement (and provided the accelerator pedal is depressed sufficiently to open the throttle fully) the making of the second break 25, 27, will cause a change to higher ratio automatically.

The lost motion device 37 enables the accelerator pedal to be moved beyond its full throttle position so that it can be moved backwards and forwards to a predetermined extent whilst the throttle remains fully open; this action enables the operator to vary tension of the spring 24 thereby varying the input speeds at which the contact 25 will contact with 26 and 27. The operator can thereby vary and select the required range of engine speeds and gear ratios whilst remaining at or about full opening of the throttle.

In order to provide a neutral condition a valve or cock 60 is fitted in a pipeline 63. This valve is connected by elements 61, 35, and spring 62, to the accelerator pedal. The initial movement of the pedal opens this cock to admit oil to the distributor of my said British patent whereby the input shaft is connected to the gear. This occurs while the lost motion 41 is being taken up.

When used with the gear described in my said prior British patent, the operation of the device is as follows: The initial movement of the pedal 36 will open the valve 60 to the distributor clutch pipeline 63 and a clutch will be engaged and the vehicle will move off with the highest ratio engaged.

The governor will close the contacts 25, 26, when the engine reaches some given maximum speed (e. g. maximum torque speed) and will close the contacts 25, 27, at a somewhat lower speed. The actual speeds depend on the governor arrangement and the strength of the spring 24 which will vary according to the position of the pedal and the hand control and the distance apart of the contacts.

Before the accelerator pedal is depressed sufficiently to open the throttle fully the closing of contacts 25, 27, will have no effect on the transmission ratio because the circuit is only completed when the throttle is opened fully and the third break 27, 29, is closed. A change to higher ratio can, however, be obtained at will by depressing the accelerator pedal to full throttle or beyond and thereby stiffening the spring 24 and simultaneously closing 27, 29, provided such change would not produce engine speed above predetermined maximum. Change to lower ratios can also be made at will when required by opening the throttle and moving the pedal only sufficiently to close the contacts 25, 26. If a change has been made to the second ratio, a further up change will be made if engine speed is still high enough to keep 25, 26, closed. Any degree of acceleration can be made in each ratio in turn (up to a maximum acceleration obtainable from the vehicle) according to the position of the pedal, i. e. according to the throttle opening and the tension of the spring 24, the maximum tension of which will cause engine speed to be a maximum before the governor closes the first break for a change to lower ratio.

If the vehicle is proceeding in say any ratio a higher ratio will not automatically result from low engine speed unless the third break 27, 29, is closed. Thus, if the vehicle is proceeding in some intermediate gear ratio at part throttle, a change to higher ratio is not required for the engine is not developing full power and a change down to higher ratio is only required to enable the engine to develop greater power. A change to higher ratio is obtainable at will by opening the throttle fully and closing the third break provided that the opening throttle does not increase the engine speed sufficiently when a change to higher ratio is not then required.

Movement of the pedal beyond the position giving full throttle will vary the stiffness of the spring 24 while the throttle remains fully opened, so that a change is always available at full throttle unless this would produce engine speed above the given maximum, for example, maximum horse power, determined by the maximum tension of the spring.

Any speed therefore above stalling speed can be obtained on any ratio and any degree of throttle opening.

If the vehicle is moving at say 15 miles per hour in top gear (1:1) at a steady speed on level road and with the throttle partly open, there would be a tendency to change to higher ratio with known automatic controls because the action is speed responsive whereas change to higher ratio might frequently be required without change of speed, for example when on a gradient. Even if a change is not made by such known controls on a small throttle opening, it will probably occur on further movement of the throttle. This changing is not required and most undesirable and from a purely theoretical point of view is only required on full throttle and in practice is very often not then required as the driver desires to proceed quietly and without increase in engine speed. Similar disadvantages result at the other end of the performance range and in keeping this defect out as much as possible, changes are made too late when gradient or acceleration performance is required.

In the apparatus of the present invention, neither of these disadvantages result for movement slightly past full throttle will give a ratio change only when required and only when at about full throttle and any movement from full throttle to less than full throttle will not give the change to higher ratio.

It should be appreciated that maximum torque speed may occur at say 25 miles per hour in 1:1 ratio with an average British car and a control which produces ratio changes below this speed on less than about full throttle is undesirable. In some cases, up to 50% of the running of a car may normally be done under the very conditions which would be unobtainable with certain automatic controls.

The accelerator pedal can be used for engaging a clutch on starting or when freewheeling. If desired, a dashpot may delay the clutch engagement so that engine speed may first increase or the moment of engagement may depend on the rate at which the pedal is depressed. The pedal can also be used if desired for disengaging the clutch at any required moment during driving to provide a freewheeling action.

With a stepped gear the governor and associated contacts may be so arranged that the speed difference between contact for up and contact for down change is slightly greater than that caused by change from one ratio to the next.

The spring 24 can be arranged to be varied in strength over the whole or any part of the pedal travel or can be varied should it be desired by the independent control member 40. This member could also be used for normal conditions. There may be two independent springs varied by the two controls 36, 40, but it is desirable that the additional control 40 be used only for the unusual conditions which occur very infrequently or not at all, or it may be set in a position giving the desired minimum speed. For using the engine as a brake, the control 40 varies the tension of the spring 24 whilst the throttle may not be fully open and causes also the closing of the third break so that change to higher ratio can be obtained.

A gear may be controlled by a piston or cylinder 6, 7, the valves 11, 12 of which are manually operated by buttons, foot pedals, or a lever.

If desired means may be provided for varying and fixing at will the highest ratio to which the gear would fall for starting as it may often be unnecessary always to go down to the first ratio on stopping. For example a hand lever may be set to hold a rod engaging a pin on the rack 5 to limit the movement of the rack. Alternatively a Bowden wire control may be provided having a certain amount of movement to determine the movement of the rack.

I claim:

1. Change speed control system for power plants including an engine with means for manually operating the throttle thereof, coupled to a variable speed transmission gear having an input and an output shaft, comprising: means for varying the velocity ratio of said transmission, means for actuating said ratio varying means to increase said velocity ratio, means for actuating said ratio varying means to decrease said velocity ratio, means responsive within a certain range of input shaft speed to actuate either of said ratio increasing and decreasing means, means operable by said manual means to vary said speed range at which said responsive means will function, means operable by travel of said manual throttle operating means beyond a predetermined throttle opening to condition said actuating means for increasing said velocity ratio, and means responsive to a fall of said output shaft speed below a predetermined minimum to actuate said ratio increasing means.

2. Change speed control system for power plants including an engine with means for manually operating the throttle thereof, coupled to a variable speed transmission gear having an input and an output shaft, comprising: means for varying the velocity ratio of said transmission, means for actuating said ratio varying means to increase said velocity ratio, means for actuating said ratio varying means to decrease said velocity ratio, means responsive within a certain range of input shaft speed to actuate either of said ratio increasing and decreasing means, means operable by said manual means to vary said speed range at which said responsive means will function, means operable by travel of said manual throttle operating means beyond a predetermined throttle opening to condition said actuating means for increasing said velocity ratio, means responsive to a fall of said output shaft speed below a predetermined minimum to actuate said ratio increasing means, and a lost motion device between the engine throttle and said manual means whereby said means can be moved beyond full throttle position.

3. Change speed control system for power plants including an engine with means for manually operating the throttle thereof, coupled to a variable speed transmission gear having an input and an output shaft, comprising: pressure fluid actuated means for varying the velocity ratio of said transmission, valve means controlling said pressure fluid actuated means to increase said velocity ratio, other valve means controlling said pressure fluid actuated means to decrease said velocity ratio, means responsive within a certain range of input shaft speed to actuate either of said valve means, means operable by said manually operated means to vary said speed range at which said responsive means will function, means operable by travel of said manual throttle operating means beyond a predetermined throttle opening to condition said first-mentioned valve means for increasing said velocity ratio, and means responsive to a fall of said output shaft speed below a predetermined minimum to actuate said first-mentioned valve means.

4. A system according to claim 3, wherein said valves are controlled respectively by electric solenoids to which current is supplied by circuits having four breaks, said system also comprising means for closing the first break when engine speed exceeds an upper limit, means for closing the second break when engine speed falls below a lower limit, means for closing the third break through said closed second break only when the engine throttle is substantially fully open, and means for closing said fourth break below idling speed.

5. A system according to claim 3, wherein said valves are controlled respectively by electric solenoids to which current is supplied by circuits having four breaks, said system also comprising means for closing the first break when engine speed exceeds an upper limit, means for closing the second break when engine speed falls below a lower limit, said means for closing said first and second breaks being operated by said speed responsive means, means actuated by said manually operated means for closing the third break through said closed second break only when the engine throttle is substantially fully open, and means centrifugally operated by said output shaft for closing said fourth break below idling speed.

HOWARD FREDERICK HOBBS.

REFERENCES CITED

The following references are of record in the file of this patent:

UNITED STATES PATENTS

| Number | Name | Date |
|---|---|---|
| 2,008,231 | Vincent | July 16, 1935 |
| 2,051,553 | Fleischel | Aug. 18, 1936 |
| 2,177,428 | Fleischel | Oct. 24, 1939 |
| 2,306,865 | Claytor | Dec. 29, 1942 |
| 2,352,212 | Lang et al. | June 27, 1944 |